United States Patent [19]

Aichelmann, Jr. et al.

[11] Patent Number: 4,718,039

[45] Date of Patent: Jan. 5, 1988

[54] INTERMEDIATE MEMORY ARRAY WITH A PARALLEL PORT AND A BUFFERED SERIAL PORT

[75] Inventors: Frederick J. Aichelmann, Jr., Hopewell Junction; William F. Shutler, Wappingers Falls; Vincent F. Sollitto, Jr., Rhinebeck, all of N.Y.

[73] Assignee: International Business Machines, Armonk, N.Y.

[21] Appl. No.: 626,564

[22] Filed: Jun. 29, 1984

[51] Int. Cl.⁴ .................. G06F 13/00; G11C 13/00
[52] U.S. Cl. .................................... 364/900; 365/219
[58] Field of Search .................. 365/219, 220, 221; 364/200, 900

[56] References Cited

U.S. PATENT DOCUMENTS

| | | | |
|---|---|---|---|
| 3,166,739 | 1/1965 | Haynes | 365/220 X |
| 4,402,067 | 8/1983 | Moss et al. | 365/219 |
| 4,489,381 | 12/1984 | Lavallee et al. | 364/200 |

Primary Examiner—Gary V. Harkcom
Assistant Examiner—Randy W. Lacasse
Attorney, Agent, or Firm—Sughrue, Mion, Zinn, Macpeak & Seas

[57] ABSTRACT

A dual ported buffer memory for a hierarchical memory, cmprising an addressable memory array for multi-bit words and a multi-bit register. Data is transferred a word at a time between the memory array and a multi-bit bus to a higher level in the memory system and between the memory array and the register. Data is transferred a bit at a time between the register and a single serial line. Concurrent operations are possible for transfers between the memory array and the parallel bus and between the register and the serial line.

7 Claims, 11 Drawing Figures

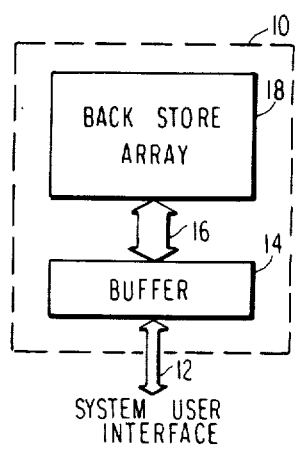
FIG.1
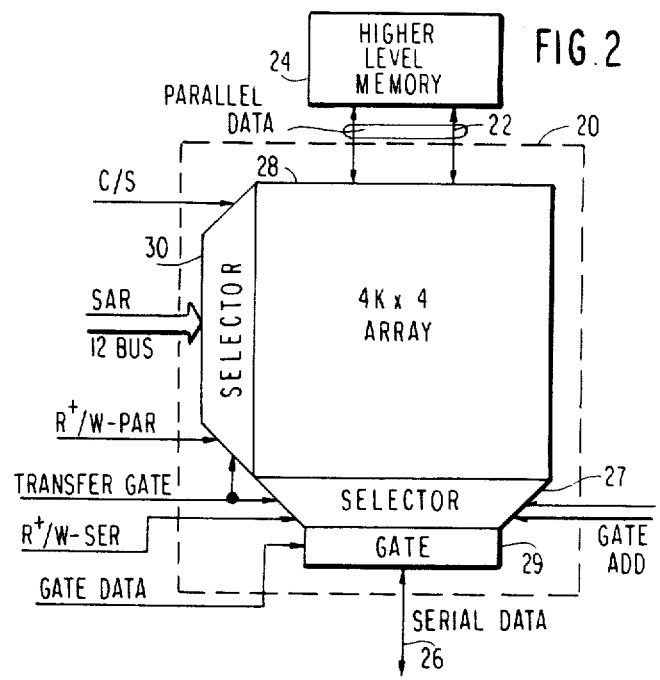
FIG.2
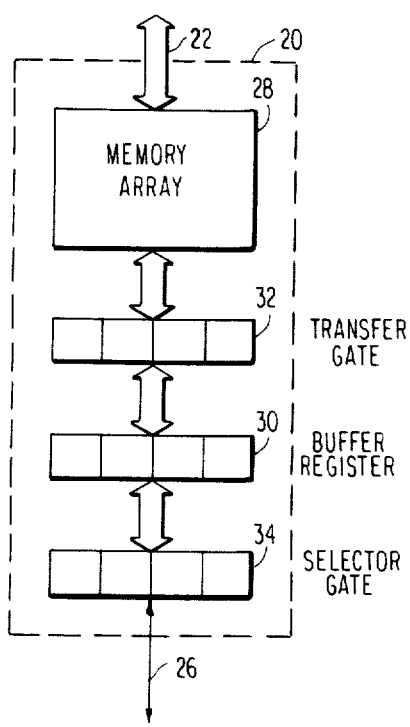
FIG.3
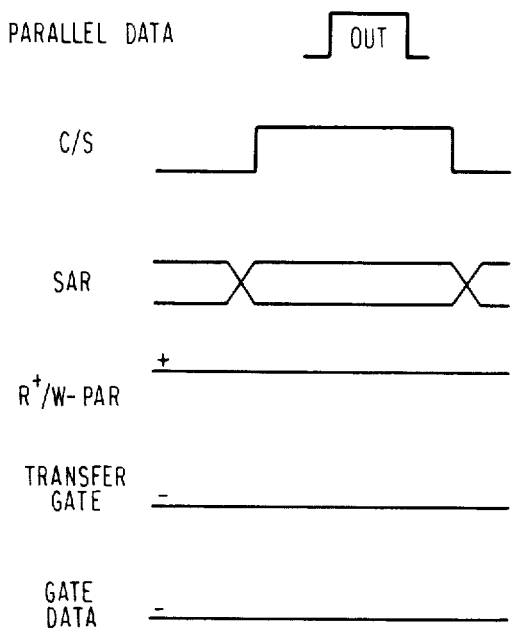
FIG.8 STORE PARALLEL WITHOUT BUFFER ACTIVITY

INTERMEDIATE MEMORY ARRAY WITH A PARALLEL PORT AND A BUFFERED SERIAL PORT

BACKGROUND OF THE INVENTION

The invention relates generally to computer memory architecture. In particular, the invention relates to a memory chip for use in a hierarchical memory system for a computer.

In a computer system, the performance of the memory subsystem is a function of the capacity of the memory and the rate at which data can be read from or written into the memory. The larger and faster the memory is built, the higher performance level one can judge the computer to operate at. However, those computer applications with high performance requirements usually have cost and physical constraints which limit the use of very fast memory chips as the exclusive memory elements for the memory subsystem. These high performance applications usually resort to a hierarchical memory architecture which combines a small but very high speed buffer memory with a more dense but slower memory. The result is a high performance product built at a reasonable price.

One example of a memory system 10 is illustrated in block diagram form in FIG. 1. A single communication path 12 links the memory system 10 to the processor of the computer. The communication path 14 can be either a single serial line or can be a multi-line bus. Within the memory system 10, the communication path is connected to a memory buffer 14 which serves as intermediate storage. Also connected to the buffer 14 is an internal memory bus 16 linking the buffer 14 to a back store array 18. The back store array 18 is very much larger than the buffer 14 but the array 18 typically operates much more slowly than the data rate on the communication path 12 to the processor. The use of the buffer 14 decouples the operating rates of the back store array 18 from that of the communication path 12, thereby allowing the use of large but relatively slow and relatively inexpensive memory chips in the back store array 18. What is thus illustrated in FIG. 1 is a hierarchical memory system with two levels of memories 14 and 18 plus the lower level associated with the user. Memory systems have been proposed in which the hierarchical memory has been extended beyond the illustrated two levels.

The buffer 14 can be an input/output buffer which simply accommodates the differing operating rates of the communication path 12 and of the internal memory bus 16. However, the buffer 14 can be provided with additional functions to perform as a cache memory. In a cache memory, large blocks of data are down-loaded from the back store array 18 to the cache buffer 14. Thereafter, whenever the processor requires data from the block of data already in the cache buffer 14, whether it be a read or a write operation, the access is made directly to the cache buffer 14 without the requirement of an access to the back store array 18. Eventually, any updated data in the cache buffer 14 needs to be up-loaded to the back store array 18 when the cache buffer 14 is required for a different block of data.

The design of the intermediate memory or buffer 14 is crucial to the overall performance of the memory system since it controls the flow of data between the back store array 18 and the processor. The buffer 14 illustrated in FIG. 1 is a two-port buffer because it receives and sends data on two sets of lines 12 and 16. A dual ported memory is described by Lavalee et al in a patent application, Ser. No. 405,812, filed Aug. 6, 1982 now U.S. Pat. No. 4,489,381, and incorporated herein by reference. The memory of Lavalee et al is an array of individually addressable words. As a result, the memory of Lavallee et al can function as an intermediate cache memory. The memory of Lavalee et al has two ports, each connected to their respective parallel busses. Such a port will be called a parallel port. Lavalee et al further provides a buffer at the port to the next higher memory level, for example, the port of the buffer 14 to the back store array 18. Their intermediate memory array is therefore operating at the data rate of the communication path 12 while their buffer can be accommodating the slower flow of data on the internal memory bus 16. One of the disadvantages of the memory of Lavalee et al is the requirement that the fairly large memory array be operating at the rate of the communication path 12 to the processor, that is, that it be operating at processor speeds.

Some computer systems have been proposed in which the communication path 12 is a serial line, that is, a single line rather than a bus, that is operating at very high data rates. The internal memory bus 16 to the back store array 18 would preferably be a fairly wide bus in order to match the data rate, rather than the bit rate, of the back store array 18 to the data rate on the serial communication path 12. It is not believed that the dual ported array of Lavallee et al is applicable to such a system. Furthermore, such a buffer 14 with serial data on one side and parallel data on the other presents several design difficulties if the buffer 14 is to be used as cache memory. Such a cache buffer should easily pass data through from the serial communication path 12 onto the internal memory bus 16. It should also have the capability of quickly replacing portions of its data from the back store array 18 when the serial communication path 12 request access to a piece of data not currently stored in the cache buffer 14. Lastly, the operations to the serial communication path 12 and to the parallel internal memory bus 16 should be made as independent as possible and to operate concurrently in order to speed the overall data transfer.

Haynes discloses in U.S. Pat. No. 3,166,739 a memory array that can be read either serially or in parallel. However this memory does not offer the broad concurrency of operation that is desired. Rao in U.S. Pat. No. 4,347,587 discloses another memory array with both serial and parallel access. However, this duality of access extends only to reading and not to writing operations, which are necessarily serial writing operations, which are necessarily serial writing operations. Furthermore, this duality is accomplished by separate parallel and serial arrays. Fuhrman in U.S. Pat. No. 4,120,048 discusses concurrent random and sequential access operations. However all of his ports are of equal width and the seriality and randomness refers to the address sequence rather than the format of data words. Also, Correlle et al. discloses in U.S. Pat. No. 3,332,066 both single bit and multi-bit access to a core memory, such as would be used for a scratch pad memory. Aichelmann and Neves in U.S. Pat. No. 4,388,701 disclose a multi-layer memory array. However, their ports are all serial. Finally, Stringa in U.S. Pat. No. 4,163,281 disclose a matrix rotator which has the effect of outputting serially a row of data that was inputted in parallel and vice versa for the columns.

SUMMARY OF THE INVENTION

Accordingly, it is an object of this invention to provide an intermediate memory in a hierarchical memory system in which the intermediate memory has both a serial port and a parallel port.

It is another object of this invention to provide an intermediate memory that provides buffering on the serial port.

It is a further object to provide an intermediate memory in which operation for a cache function can be quickly and efficiently performed.

The invention can be summarized as a memory array for use as an intermediate memory in a hierarchical memory system in which the intermediate memory consists of a memory array. The intermediate memory has both a parallel port to the higher levels of memory and a serial port to lower levels. A buffer is provided at the serial port. Data transfer on the memory array side of the buffer are performed in parallel but data is extracted serially from the buffer to the serial port. Data transfer between the serial port and the buffer may be performed concurrently with data transfer between the memory array and the parallel port.

BRIEF DESCRIPTION OF THE DRAWINGS

FIG. 1 is a schematic illustration of a hierarchical memory.

FIG. 2 is a schematic representation of the intermediate memory of this invention.

FIG. 3 is a schematic diagram illustrating the functional stages of the memory of the invention.

FIGS. 8–11 are timing diagrams for different operations of which the buffer memory of this invention is capable.

DETAILED DESCRIPTION OF THE PREFERRED EMBODIMENTS

Figure 4:
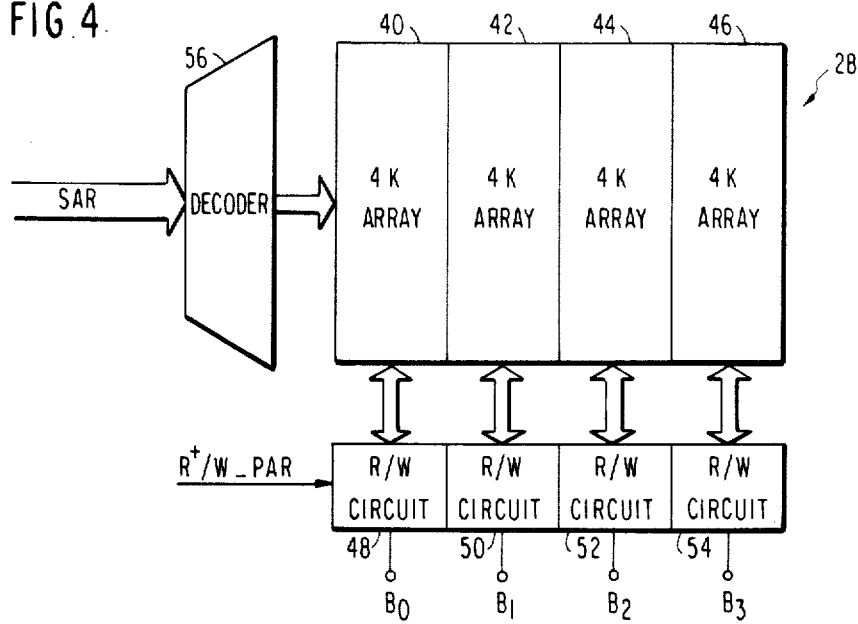
FIGS. 4–7 are detailed schematic diagrams of a circuit functionally equivalent to that of FIG. 3.

One embodiment of the invention is illustrated schematically in FIG. 2. A memory chip 20 forms the intermediate memory that is linked by a parallel bus 22 to a higher level memory 24, such as a backing store. A serial data line 26 links the memory chip 20 with the processor. In a general hierarchical memory system, there may be additional yet higher levels of memory above the higher level memory 24 and there may be one or more lower level memories between the memory chip 20 and the processor.

The memory chip 20 comprises an addressable memory array 28 that has a significant number of individually addressable multi-bit words. For instance, the memory array 28 may be a 4K×4 array. Although the invention is not limited to such a sized array, the remaining explanation will be based upon these numbers for sake of illustration. A selector 27 deserializes the serial line 26 onto the parallel array 28. A gate 29 gates the data between the serial line 26 and the serial selector 27. A chip select line C/S enables all data transfer into and out of the memory array 28 on the parallel bus 22, that is, it enables the parallel port. The memory array 28 is addressed by an address bus SAR connected to an array selector 30. The SAR bus contains 12 parallel lines to address the 4K (4096) words in the memory array 28. A R+/W-PAR line indicates the direction of data flow, i.e., whether it be to or from the memory array 28. The indication applies both to the flow of the parallel bus 22 and to the serial line 26. A high signal on the R+/W-PAR indicates that the memory array 28 is being read while a low value indicates a write operation.

A TRANSFER GATE signal enables the transfer of data between the memory array 28 and a buffer associated with a port to the serial line 26. With a 4K×4 memory array 28, the buffer would be 4 bits wide. A gate address bus GATE ADD indicates the address of the buffer being accessed by the serial line 26. For a 4-bit word, the gate address bus is two lines wide. A GATE DATA signal enables the gating function of the gate to the serial line 26. Finally, a R+/W-SER signal indicates the direction of data flow from the buffer to the serial line 26 with a high value of R+/W-SER indicating that the buffer is being read by the serial line 26. The interface between the chip 20 and the parallel bus 22 is a parallel port and the interface between the chip 20 and the serial line 26 is a serial port.

FIG. 3 provides a more detailed but nonetheless conceptual illustration of the structure of the memory chip 20. A buffer register 30 is separated from the memory array 28 by a transfer gate 32 which is 4 parallel gates for the 4 bits in a word in the memory array 28. A selector gate 34 receives or sends 4 bits of data to or from the buffer register 30 but transmits only serial data to the serial line 26. The selector gate 34 thus acts as a serializer/deserializer. It is to be appreciated that while the transfer gate 32 and the selector gate 34 are illustrated as separate components, their function is to enable certain data lines for the transfer of data so they could easily be incorporated into other elements of the memory chip 20.

Yet a more detailed description of the circuitry of FIGS. 2 and 3 will now be described with reference to FIGS. 4–6. In FIG. 4 is illustrated the memory array 28 and associated circuitry. The memory array 28 consists of four 4K×1 arrays 40–46. Each 4K×1 array 40–46 is read from or written into by an associated read/write circuitry 48–54 of conventional design. The read/write circuits 48–54 are connected to four lines of an internal bus called the B bus. The R+/W-PAR input to the read/write circuits 48–54 determines whether these circuits are reading from or writing into the 4K×1 arrays 40–46. A decoder 56 receives the SAR bus and selects one corresponding location in each of the 4K×1 arrays 40–46.

Figure 5:
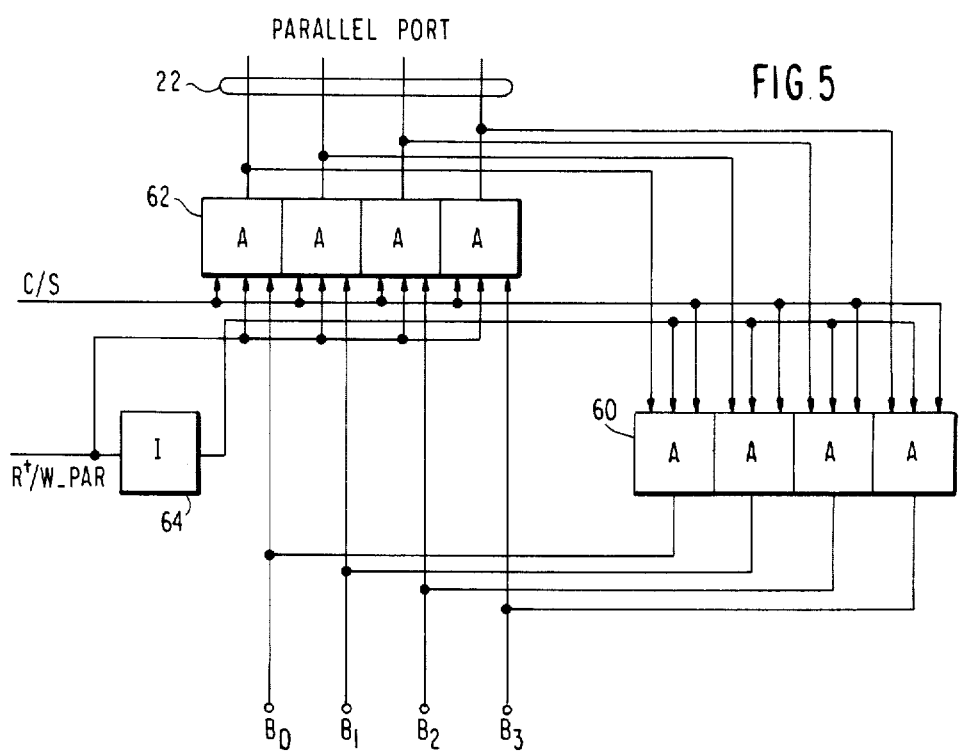

In FIG. 5 is illustrated the parallel port between the memory array 28 and the parallel bus 22. The internal B bus receives data from a parallel first bank 60 of AND gates and sends data to the inputs of another second bank 62 of four AND gates. Similarly, the second bank 62 of AND gates sends data to the parallel bus 22 and the first bank 60 of AND gates receives data on their inputs from the parallel bus 22. All the AND gates in the two banks 60 and 62 have three inputs. One of the inputs of all the AND gates are connected to the chip select signal C/S. The third inputs of the AND gates in the second bank 62 are connected to the R+/W-PAR signal while the third inputs of the AND gates in the first bank 60 are connected to the R+/W-PAR signal through an inverter 64. The result is that the banks 60 and 62 of AND gates are gates that must be doubly enabled. The second bank 62 is enabled by a high chip select signal C/S and a high R+/W-PAR signal while the first bank 60 is enabled by a high chip select signal C/S and a low R+/W-PAR signal.

Figure 6:
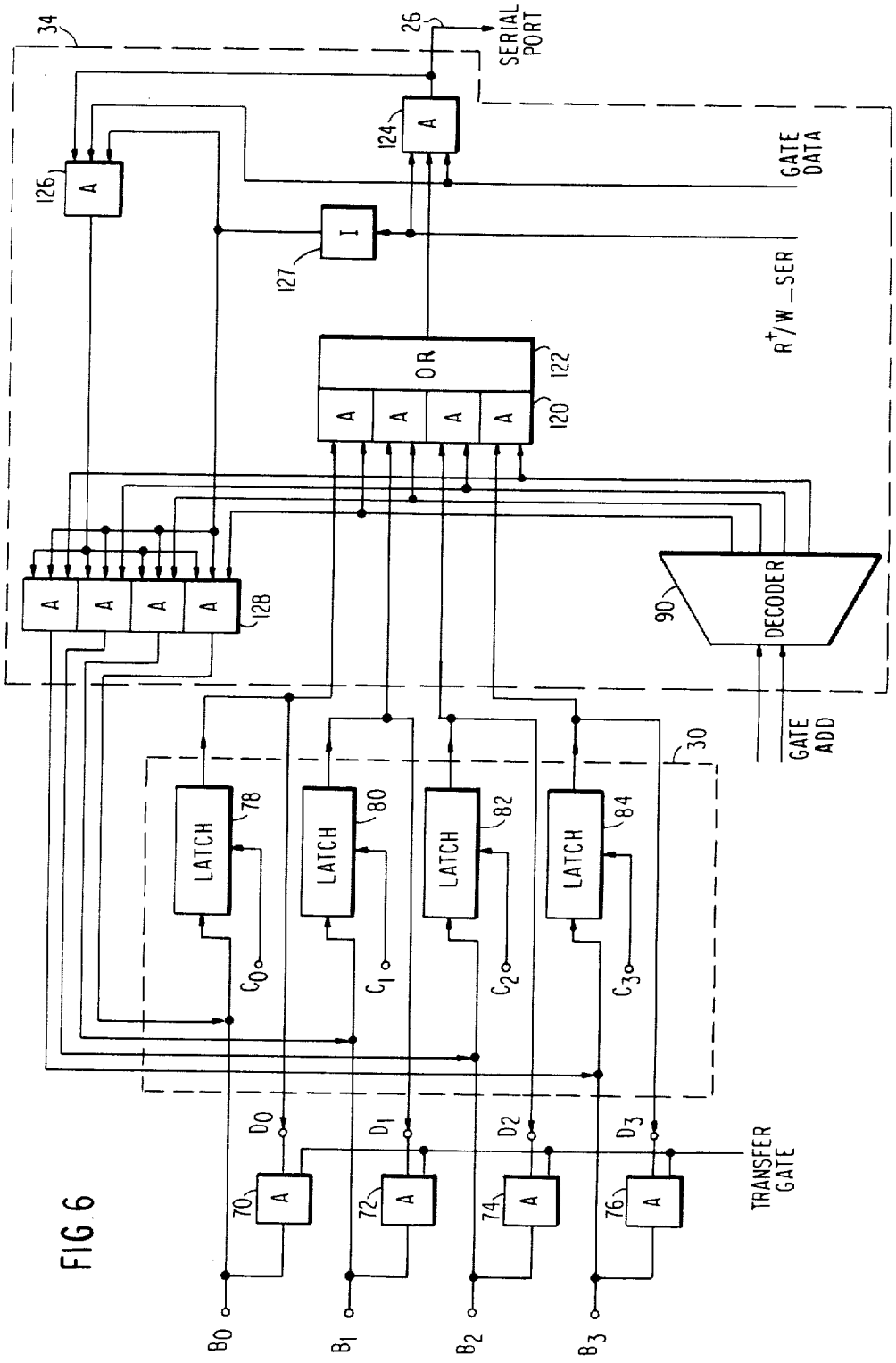
Figure 7:
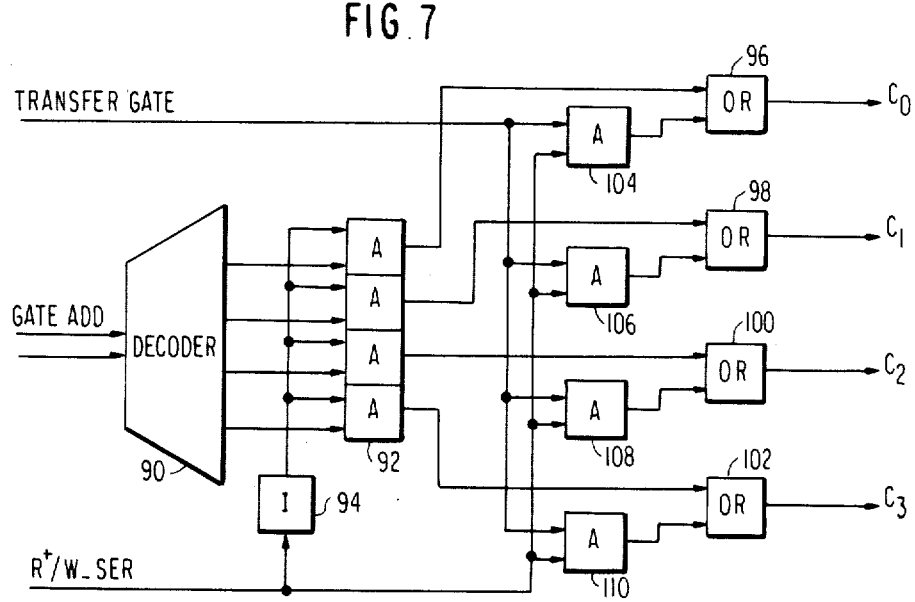

The functions of the transfer gate 32 and of the buffer register 30 are combined in common elements represented in FIGS. 6 and 7. Separate elements are used for the data flow in the different directions. For data flow from the buffer register 30 to the memory array 28, the function of the transfer gate 32 is assumed by four AND gates 70-76. The outputs of these AND gates 70-76 are connected to the internal B bus and each of the AND gates 70-76 is connected at one of their inputs to one line of an internal bus called the D bus. The AND gates 70-76 are controlled by the TRANSFER GATE signal, also connected to one of their inputs.

The D bus is connected to the output of four latches 78-84 which comprise the buffer register 30. The B bus is connected to the inputs of these four latches 78-84 and the latching function is controlled by an internal bus called a C bus.

The generation of the signals on the C bus is performed by the circuitry illustrated in FIG. 7 which, together with the latches 78-84, performs the function of the transfer gate 32 for the transfer of data from the memory array 28 to the buffer register 30. The gate address bus GATE ADD is connected to the input of a decoder 90 which selects one of four AND gates in a third bank 92. The AND gate in the third bank 92 are enabled by the R+/W-SER signal passing through an inverter 94. The outputs of the four AND gates in the third bank 92 are connected to corresponding inputs of four OR gates 96-102. The other inputs of the OR gates 96-102 are connected to the outputs of four AND gates 104-110 each of which have the same inputs of the TRANSFER GATE signal and the R+/W-SER signal. The outputs of the OR gates 96-102 are connected to the C bus.

The result of the circuit of FIG. 7 is that the latches 78-84 latch new data under two conditions. In the first condition, all the latches 78-84 latch new data when both the TRANSFER GATE signal and the R+/W-SER signal are high. In the second condition, the one of the four latches of 78-84 that is addressed by the gate address bus GATE ADD gates new data in the presence of a low R+/W-SER signal. The first condition performs the function of the transfer gate 32 for transfer of data from the memory array 28 to the buffer register 30 while the second condition exists for the transfer of data between the buffer register 30 and the serial line 26 in either direction.

The operation of the selector gate 34 will be described with reference to FIG. 6. First, the flow of data from the buffer register 30 to the serial line 26 will be described. The outputs of the latches 78-84 are connected to the inputs of four AND gates in a fourth bank 120. The AND gates are separately enabled by the four lines output by the decoder 90 of the gate address bus GATE ADD. The outputs of the four AND gates in the fourth bank 120 are combined in an OR gate 122 and the output of the OR gate 122 is connected to one of the inputs of an AND gate 124. The AND gate 124 is enabled by a high R+/W-SER signal and a high GATE DATA signal. The output of the AND gate 124 is connected to the serial line 26 and outputs serial data from the memory 20 onto the serial line 26.

For serial data transfer from the serial line 26 to the memory 20, the serial line 26 is connected to an input of an AND gate 126 which is connected both to the GATE DATA signal and to the R+/W-SER signal through an inverter 127. Thus the signal on the serial line 26 is gated through the AND gate 126 by a high GATE DATA signal and a low R+/W-SER signal. The serial data, so gated, is connected to all the corresponding inputs of four AND gates in a fifth bank 128. The fifth bank 128 is commonly enabled by a low R+/W-SER signal and the individual AND gates of that bank 128 are separately enabled by the decoder 90 of the gate address signal GATE ADD. The outputs of the AND gates in the fifth bank 128 are connected to the B bus for input to the latches 78-84, as controlled by the previously described C bus. It can be seen that the C bus controlling the latches 78-84 and the fourth and fifth banks 120 and 128 of AND gates acts as the controller for the serilizer/deserializer function.

Various types of operations for the memory chip 20, illustrated in FIGS. 2 and 3 will now be described with reference to timing diagrams. Although the described operations do not include all possible operations with the memory chip 20, they cover the important features of its use. Conventional means, such as a ROM whose address is incremented by a clock, can be used to provide the timing signals. The timing diagram of FIG. 8 illustrates the operation of a store parallel without buffer activity. The lack of buffer activity is indicated by low signals or TRANSFER GATE and GATE DATA. A read operation from the parallel bus 22 is indicated by the R+/W-PAR signal being high. The activity in the memory array 28, in this case reading from the memory array 28 onto the parallel bus 22, is enabled by a high value of the chip select signal C/S. When the C/S line goes high, the address of the word being accessed in the memory array 28 must be valid on the SAR bus. After a finite delay from the C/S signal going high, the parallel output data becomes valid on the parallel bus 22. It is of course assumed that further controls are supplied to the higher level memory 24 to receive the outputted parallel data on the parallel bus 22. Because the buffer register 30 is not being used in this operation, the values of the gate address bus GATE ADD, the R+/W-SER signal and the signal on the serial line 26 are not important.

To retrieve or fetch data from the higher level memory 24 to the memory array 28 without buffer activity, a timing diagram similar to that of FIG. 8 is used except that the value of R+/W-PAR is low and the input data on the parallel bus 22 from the higher level memory 24 must be valid.

Figure 9:
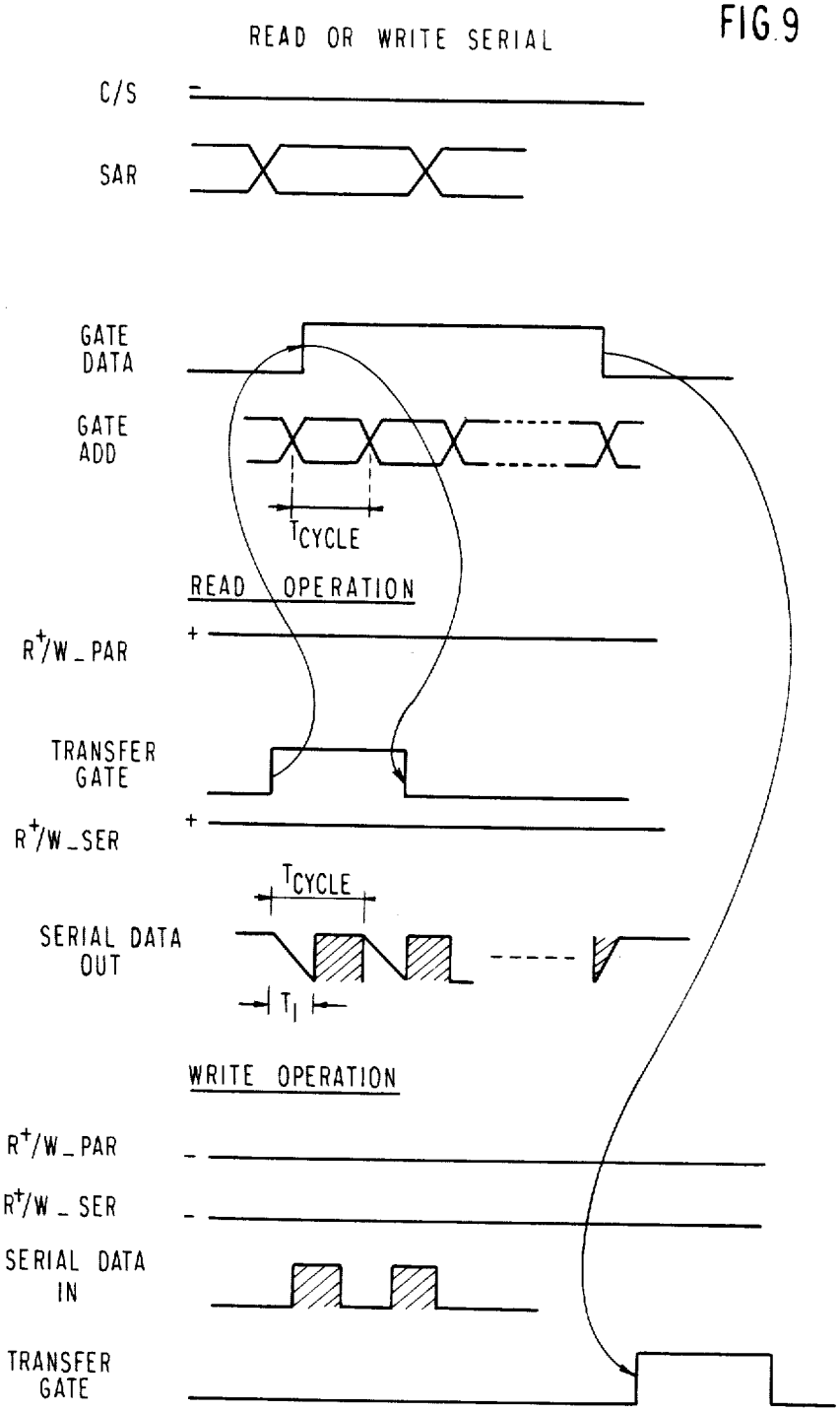

FIG. 9 illustrates the timing diagram for the operations of reading or of writing between the memory array 28 and the serial line 26, that is, a read or write serial. Because the parallel port on the memory array 28 is inactive, the chip select signal C/S is low. For a read operation from the memory array 28 to the serial line 26, both the R+/W-PAR signal and the R+/W-SER signal are high. The address of the word being read from the memory array 28 must be valid on the SAR bus when the TRANSFER GATE signal goes high. The effect of the high TRANSFER GATE signal is to transfer the data word from the memory array 28 to the buffer register 30. While the TRANSFER GATE signal is high, the gate address signal GATE ADD must be valid for one of the bits in the buffer register 30. While the gate address is valid, the gate data signal goes high to begin gating data between the buffer register 30 and the serial line 26. Data is transferred between the buffer register 30 and the serial line 26 a bit at a time. The time during which one bit is transferred is a time $T_{cycle}$. A propagation time $T_1$ is required after both the gate address is valid and the GATE DATA signal is high for the serial data on the serial line 26 to become valid. The gate address GATE ADD changes each $T_{cycle}$ to another address of the buffer register in order to output another bit. For a 4 bit word, a time of 4-$T_{cycle}$ is required to read the buffer register 30 onto the serial line 26.

The write operation from the serial line 26 to the memory array 28 is similar to the read operation. However, both the R+/W-PAR signal and the R+/W-SER signal are low. Also, the TRANSFER GATE signal is delayed until the buffer register 30 is filled from the serial line 26. Finally, the data on the serial line 26 must be valid during the time that the proper gate address signal GATE ADD is valid.

Figure 10:
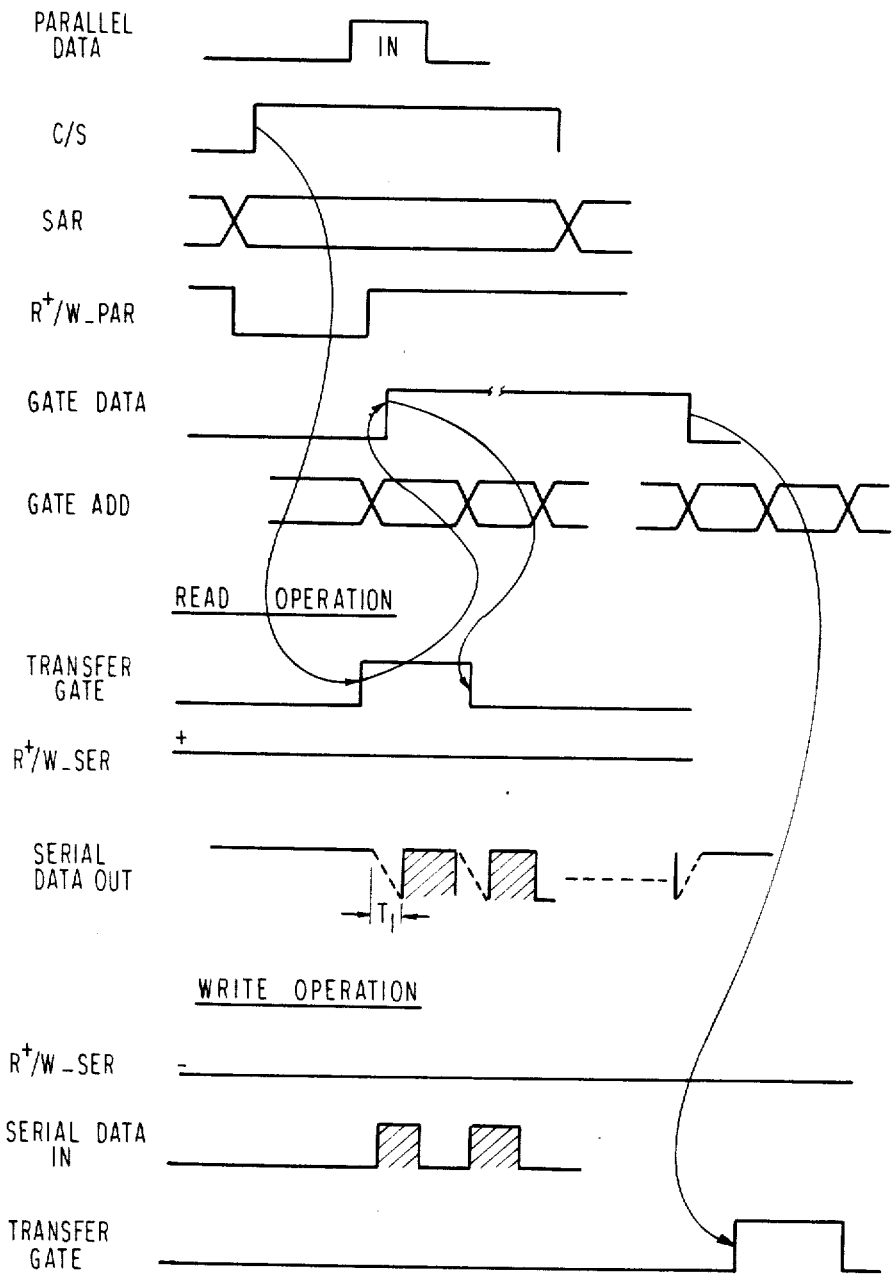

The timing diagrams of FIG. 10 illustrate the operations of a fetch parallel from the parallel bus 22 followed by a read or write between the memory array 28 and the serial line 26. These types of operation are required for a cache memory when the serial line 26 wants to access a word of data not currently in the memory array 28. The word must first be fetched via the parallel bus 22 before it is accessed by the serial line 26.

The operation of fetch parallel with read serial will be described first with reference to the timing diagram of FIG. 10. In the first phase of the operation, a parallel word is fetched by the parallel bus 22 to the memory array 28. The address in the memory array 28 in which the word is to be stored is indicated on the array address bus SAR. The R+/W-PAR is low in the initial phase of the operation, indicating that a word is being written into the memory array 28. The chip select signal C/S goes high, indicating activity at the parallel port. Parallel data that is valid on the parallel bus 22 at the end of the negative pulse of the R+/W-PAR signal, that is, the upward transition, are stored in the location of the memory array 28 indicated by the array memory address bus SAR. This completes the initial phase of the operation which is common to the fetch parallel, whether with a read serial or a write serial.

To complete the read serial operation, the R+/W-SER signal is high. After the parallel data has been stored in the memory array 28, the TRANSFER GATE signal goes high which transfers the word indicated by the array address bus SAR to the buffer register 30. Thereafter, the GATE DATA goes high to begin gating the word in the buffer register 30 onto the serial line 26. The selection of the bits within the buffer register 30 are indicated by the gate address signal GATE ADD and results in a sequence of serial bits on the serial lines 26.

The fetch parallel with serial write will now be described. In this operation, a word is first fetched via the parallel bus 22 and then the same word is overwritten by data written into the memory array via the serial line 26. As mentioned previously, the parallel fetch phase is the same for both the serial read and the serial write operation. The serial write operation is indicated by a low value for the R+/W-SER signal. Valid input data on the serial line 26 is gated into the buffer register 30 by a high value of the GATE DATA signal and the address within the buffer register 30 is indicated by the gate address signal GATE ADD. The gating is terminated by the downward transition of the GATE DATA signal. Then the TRANSFER GATE signal goes high to transfer the contents of the buffer register 30 into the memory array 28. The contents are stored in the location in the memory array 28 indicated by the array address bus SAR. If the SAR address has changed since the fetch parallel phase, the serial word will be written into a different location than the word fetched from the parallel bus 22.

It should be noted that the transfer of serial data between the buffer register 30 and the serial line 26, whether it be a read or a write, can be performed concurrently with the fetch of the parallel data from the parallel bus 22 to the memory array 28.

The final operation to be described is the cast out operation. The situation often arises in the use of the memory array 28 as a cache memory that it is desired to read a word of data from the serial line into the memory array 28 but there is no space presently available in the memory array 28. In this case, a location is freed in the memory array 28 by first writing the contents of that location onto the parallel bus 22 and then refilling that location with a different word from the serial line 26. Of course, the controller for the memory chip 20 must keep a directory of what data words are stored in what locations in the memory array, that is, the correspondence between the words in the backing store and in the memory array 28 is dynamically changing.

Figure 11:
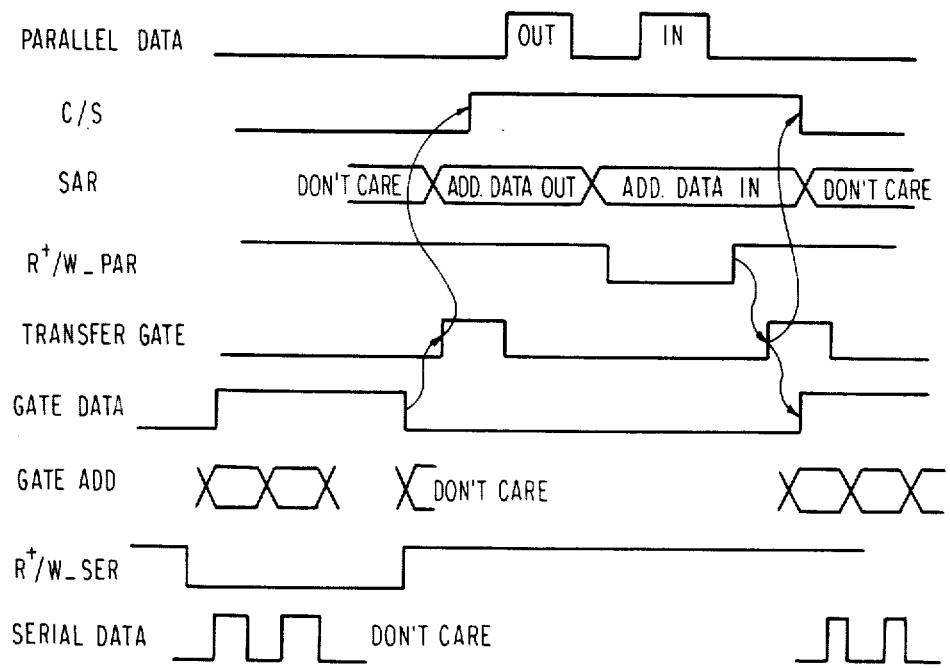

The cast out operation begins, according to the timing diagram of FIG. 11, with the word being read from the serial line 26 into the buffer register 30. The R+/W-SER signal is low indicating a write to the buffer register 30. The serial data is gated into the buffer register 30 by a high GATE DATA signal and the location within the buffer register 30 is indicated by the gate address signal GATE ADD.

Once the data is stored in the buffer register 30, the R+/W-PAR signal is held high and a positive transition of the TRANSFER GATE signal causes the contents of the buffer register 30 to be transferred into the memory array 28 at the location indicated by the array address bus SAR. Then when the chip select signal C/S goes high with the array address bus SAR remaining the same, this same word is passed on to the parallel bus 22. Data is then fetched from the parallel bus 22 into the memory array 28 by a low R+/W-PAR which stores valid input data on the parallel bus 22 into the location of the memory array 28 indicated by the array address bus SAR. The fetching may be to a different address in the memory array 28 if the memory address bus signal SAR changes. This same data is transferred to the serial line 26 by a high R+/W-SER and a high pulse of the TRANSFER GATE signal which transfer the data from the memory array 28 to the buffer register 30. Finally, a positive pulse of the GATE DATA signal combined with a sequencing of the gate address signal GATE ADD transfers the contents of the buffer register 30 to the serial line 26.

It is to be noted that, although the illustrated timing diagram describes a sequential set of operations, it is possible to overlap simultaneous or concurrent operations between the parallel bus 22 and the memory array 28 and between the serial line 26 and the buffer register 30. A variation of the cast out operation allows the illustrated set of operations to be considerably compressed in time. In this sequence, the single buffer register 30 is replaced by a double register, sometimes called a ping-pong register. With this additional register, input data from the serial line 26 is read into one of the registers at the same time that other data is being passed from the parallel bus 22 through the memory array 28 to the other of the registers. Then the contents of the first register are passed to the memory array 28 at the same time that the contents of the second register are passed on to the serial line 26.

The memory chip illustrated in FIGS. 2 and 3 has the capability of providing the operations illustrated by the timing diagrams of FIGS. 8-11 and provides many advantages. The array type buffer chip can support concurrent operations between lower and higher levels of the hierarchical memory that are implemented in different technologies operating at different performance levels. The array chip of the invention provides an efficient interface between the differing technologies. The efficiency of the overall memory system is improved because of the capability of the buffer array requires fewer operations between the different levels in the hierarchical memory system for a given transfer of data. The reduced number of operations results in improved memory availability.

The memory array buffer provides for an interface transformer between the different technologies with which it is in communication via the parallel bus and the serial line. No additional serial interface circuits or buffers are required to couple together differing technologies, such as would be required for a memory system using both field effect transistors and bipolar transistors.

The cast out operation can be performed with the buffer array of this invention with a minimum of additional buffers because the transfer back to the slow higher level memory can be performed while the buffer register to the lower level is also being used. Obviously, this concurrent operation is impossible with a single port buffer chip.

Because the buffer array of this invention involves a serial to parallel conversion and the parallel lines can be connected to different memory chips, the effects of a failed memory chip can be more easily handled by error correction codes. The failed chip contains only a small fraction of the word, thereby easing error correction.

Because the buffer array acts as a deserializer for the backing store, the use of additional upper interface support circuits at the backing store are not required for memory chips with multiple bit outputs, as would be required if the data path to such a backing store was a single line.

We claim:

1. A memory chip for a hierarchical memory system, comprising;
    a read/write memory array of a plurality of locations, each location consisting of a plurality of bits of number n;
    means for addressing any of said locations;
    a parallel bus connected between said read/write memory array and a next higher level of said hierarchical memory system then a level of said read/write memory array, said bus having a width n;
    means for transferring data bidirectionally between said parallel bus and any addressed location in said memory array;
    a buffer register having a plurality of bits of number n;
    means for transferring data bidirectionally between any addressed location in said memory array and said buffer register; and
    means for serializing and transferring data from said buffer register to a serial line to a lower level in said hierarchical memory system and for deserializing and transferring data from said serial line to said register.

2. A memory chip as recited in claim 1, further comprising:
    means for selecting a direction for performing said transferring of data between said parallel bus and said memory array; and
    means for selecting the direction of said transferring of data between said serial line and said register.

3. A memory chip as recited in claim 1, wherein said addressing means comprises:
    an array address bus; and
    a selector receiving said address bus and selecting one of said locations according to the signals on said array address bus.

4. A memory chip as recited in claim 3, wherein said transferring, serializing and deserializing means comprises:
    a gate address bus;
    a selector receiving said gate address bus and selecting a bit location in said register based on the signals on said gate address bus.

5. A method of transferring data through a buffer array, comprising the steps of:
    a first transferring step of transferring sequential bits between a serial line and different bit locations in a buffer register having n bit locations, thereby serializing data on transferring said data from said register to said serial line and deserializing data on transferring said data from said serial line to said register;
    a first addressing step of addressing one of a plurality of locations in a memory array, each location having n bit locations;
    a second transferring step of transferring said data between said buffer register and said location in said memory array addressed in said first addressing step, said second transferring step being performed in parallel on n bits;
    a second transferring step of addressing one location in said memory array; and
    a third transferring step of transferring the contents of the location addressed in said addressing step between said memory array and a parallel bus of width n, said third transferring step being performed in parallel on n bits.

6. A method as recited in claim 5, wherein said first and third transferring steps are performed concurrently.

7. A method as recited in claim 6, further comprising the steps of:
    a first selection step of selecting a direction for performing said transferring in said second transferring step; and
    a second selections step of selecting the direction of transferring in said third transferring step.

* * * * *